Patented June 23, 1936

2,045,415

UNITED STATES PATENT OFFICE 2,045,415

SALVES, CREAMS, SOAPS, AND THE LIKE

Walther Schrauth, Berlin-Dahlem, Germany

No Drawing. Application November 30, 1934, Serial No. 755,417. In Germany November 23, 1933

5 Claims. (Cl. 167—63)

This invention relates to cosmetic and medicinal preparations. More particularly it relates to salves, creams, soaps and like preparations to be applied to living bodies. Still more particularly it relates to a method for increasing the flexibility and resorbility of such preparations.

Many formulae have been used to produce salves, creams, soaps, etc. and particularly many different materials have been incorporated therein to increase the flexibility and resorbility. For these purposes lanolin and waxes have been used frequently. More recently the use of alcohols of high molecular weight have been proposed. These have not proved satisfactory, however, since, when preparations containing these alcohols are spread on the skin, they have a tendency to cluster together and form small, firm lumps which do not dissolve and which are difficult to rub into the skin. Apart from this defect the alcohols have properties which make their use in such preparations very desirable.

It is an object of this invention to produce improved salves, creams, soaps and the like. It is a further object of this invention to produce preparations for use on the skin of living bodies and having increased flexibility and resorbility. Other objects will appear hereinafter.

These objects are accomplished by incorporating myristyl alcohol, (14 carbon atoms) into preparations for use on the skin of living bodies particularly human beings, i. e. by preparing salves, creams, soaps and the like containing myristyl alcohol in varying quantities. The fact that myristyl alcohol makes such good skin preparations in contrast to the unsatisfactory preparations obtained by using other high molecular weight alcohols is explained by the fact that myristyl alcohol melts at 38° C. which is very close to body temperature and thus the heat of the body renders the spreading of myristyl alcohol compositions more easy.

In order to illustrate the use of the new superfatting agent a few examples are given. These examples are not to be construed as limiting the scope of the invention.

Example 1

30 grams of myristyl alcohol and 9 grams petrolatum are melted together on a water bath. Into the molten mass, 7 grams glycerine in 30 grams of water at 60° C. are stirred. After cooling, a salve-like substance which can be used as salve-base for medical purposes is obtained.

Example 2

80 parts of myristyl alcohol and 20 parts of stearin are melted together and a mixture of 10 parts of oleic acid triethanolamine, 200 parts of glycerine and 400 parts of water added. The cream thus obtained is perfumed after cooling in a suitable manner and represents an excellent skin preparation which may be spread very easily.

Example 3

Neutral olive oil potash soap is compounded with 20% myristyl alcohol and stirred to a cream after perfuming it. This cream is excellently suitable for cosmetic purposes.

Example 4

100 parts of palm oil, 100 parts of olive oil and 40 parts coconut oil are melted together and a mixture of 100 parts of potassium hydroxide solution of 50° Bé. with 140 parts of water added. The mixture is kept about 1½ hours at a temperature of 80 to 90° C., after which time the saponification is finished. 50 parts of myristyl alcohol are now added and everything cooled while stirring constantly. The soap cream received may be well used for shaving creams and the like.

Example 5

To the flakes of normally boiled basic soap, 5% myristyl alcohol are added in the crushing machine (Piliermaschine) after the customary perfumation. A crushed soap is received of good washing capacity, which gives to the skin a high flexibility. The addition of myristyl alcohol can also be done in the feeder (Zubringer), when the soap is still liquid.

A wide variety of compositions involving myristyl alcohol have been described. These compositions merely serve to illustrate the broad group of compositions for use on the skin of living bodies, particularly human bodies, to which this invention may be applied. The invention having been made clear, its application to various salves, creams, soaps, etc. will be apparent to one skilled in the art.

The proportion of myristyl alcohol to be used in a given composition will vary not only with the nature of the composition itself but also with the use for which it is intended.

Preferably, only fairly pure myristyl alcohol will be used but the invention is not thus limited. The presence of impurities such as lauryl and cetyl alcohols or other materials which do not have harmful effects is permissible and may even be desirable in some cases.

The advantages of the use of myristyl alcohol in compositions to be applied to living bodies are apparent. The fact that its melting point is so close to the body temperature of living bodies, particularly human bodies, makes its spread much more readily. In addition, however, the facts that it is neutral, has good dissolving properties, does not irritate the skin and is well resorbed give it additional attraction to the manufacturer of skin preparations.

The myristyl alcohol, likewise, because of its nature is more efficient in its effect on the skin. The additional effect is prominent even in a case where myristyl alcohol is worked up in connection with other cosmetic agents, as for instance shaving creams, soaps, and the like. If myristyl alcohol is added to medical salves, an increased intensified effect of these preparations is received and a durable fixation of the effective ingredients on the body, whereby it is to be noted that the myristyl alcohol possesses on the whole special fixation strengths for the easily volatile constituents which are embodied in the above mentioned cosmetic and medical preparations of all kinds.

It is apparent that many widely different embodiments of this invention may be made without departing from the spirit and scope thereof and, therefore, it is not intended to be limited except as indicated in the appended claims.

I claim:

1. A salve comprising an oleaginous substance and fairly pure myristyl alcohol which contains no more than slight traces of the other higher aliphatic alcohols, said salve containing no soap.

2. A salve comprising petrolatum, glycerine, and fairly pure myristyl alcohol which contains no more than slight traces of the other higher aliphatic alcohols, said salve containing no soap.

3. A salve comprising an oleaginous substance and fairly pure myristyl alcohol which contains no more than slight traces of the other higher aliphatic alcohols, said salve being substantially free from soap.

4. A salve comprising petrolatum, glycerine, and fairly pure myristyl alcohol which contains no more than slight traces of the other higher aliphatic alcohols, said salve being substantially free from soap.

5. A salve base comprising about 9 parts of petrolatum, about 7 parts of glycerine, about 30 parts of fairly pure myristyl alcohol which contains no more than slight traces of the other higher aliphatic alcohols, and about 30 parts of water, said salve base being substantially free from soap.

WALTHER SCHRAUTH.